United States Patent [19]

Lampe et al.

[11] Patent Number: 4,580,937

[45] Date of Patent: Apr. 8, 1986

[54] APPARATUS FOR BACK STRIPPING STACKS OF PAPER SHEETS OR THE LIKE

[75] Inventors: Siegfried Lampe, Ellerbek; Bernd Ramcke, Hamburg, both of Fed. Rep. of Germany

[73] Assignee: E. C. H. Will (GmbH & Co.), Hamburg, Fed. Rep. of Germany

[21] Appl. No.: 585,136

[22] Filed: Mar. 1, 1984

[30] Foreign Application Priority Data

Mar. 4, 1983 [DE] Fed. Rep. of Germany ....... 3307680

[51] Int. Cl.[4] .......................... B42C 9/02; B65G 47/91

[52] U.S. Cl. .................................. 412/27; 198/471.1; 198/689.1

[58] Field of Search ........................ 412/12, 13, 16, 27, 412/28, 30, 36, 37; 198/689, 690

[56] References Cited

U.S. PATENT DOCUMENTS

| | | | |
|---|---|---|---|
| 2,646,104 | 7/1953 | Hawkes | 412/27 |
| 2,895,148 | 7/1959 | Hildmann | 412/27 |
| 3,364,092 | 1/1968 | Hawkes et al. | 412/27 |
| 3,477,558 | 11/1969 | Fleischauer | 198/689 |
| 3,682,469 | 8/1972 | Ito et al. | 198/689 |
| 3,722,665 | 3/1973 | Probasco | 198/689 |
| 3,739,412 | 6/1973 | Card et al. | 412/27 |
| 3,827,548 | 8/1974 | Matsuo | 198/689 |
| 4,151,037 | 4/1979 | Klingelhoefer et al. | 412/27 |

*Primary Examiner*—Paul A. Bell
*Assistant Examiner*—Paul M. Heyrana, Sr.
*Attorney, Agent, or Firm*—Peter K. Kontler

[57] ABSTRACT

Apparatus for back stripping stacks of paper sheets or the like has a transporting unit which advances suitably staggered stacks along a horizontal path toward, to and beyond a back stripping station. The apparatus further comprises a carrier for an endless suction conveyor which draws requisite lengths of a web of backing strip material from a source of supply and past an adhesive applicator which coats the exposed side of the web with adhesive before the foremost back strip is severed therefrom and is temporarily held by the suction conveyor for application to the selected edge face of the stack at the back stripping station. This is achieved by moving the carrier from below upwardly into the path of an oncoming stack if the edge face about to receive the back strip is the leading edge face of such stack. If the edge face to be provided with a back strip is the lateral edge face, the carrier is laterally adjacent to the path of movement of stacks and is pivotable toward and from the edge face of the stack at the back stripping station.

27 Claims, 9 Drawing Figures

16
21a
41
42
43
31
26b
38
47a
14
17
32
33
IV
IV
8
8
8
8
3
3
3
3
9
47
44a
26a
2a
2
6
44
29
22
1
39
38a
21
24

APPARATUS FOR BACK STRIPPING STACKS OF PAPER SHEETS OR THE LIKE

BACKGROUND OF THE INVENTION

The present invention relates to apparatus for converting stacks of superimposed paper sheets or the like into exercise books, steno pads or analogous stationery products. More particularly, the invention relates to improvements in so-called back stripping apparatus wherein the sheets of stacks of paper sheets, cardboard sheets and/or like sheets are united by adhesive-coated back strips which normally consist of textile material.

It is already known to connect the sheets of a stack of paper sheets or the like by resorting to adhesive-coated back strips which are normally made of a textile material and are caused to overlie and to be bonded to one edge portion and to the adjacent portions of the major surfaces of a stack of paper sheets or the like. As a rule, the stacks are delivered to and advanced past and beyond the back stripping station by a transporting system which is operated intermittently by a suitable prime mover. Heretofore known back stripping apparatus employ a conveyance which is movable back and forth in and counter to the direction of transport of the stacks and is provided with a support for the back strip which is about to be adhesively secured to a selected edge face of a stack of paper sheets or the like and with means for biasing the back strip against the selected edge face of the stack at the back stripping station. The stack which is about to be back stripped is supported by a table plate which is tilted in order to move the stack thereon against the adhesive-coated surface of the back strip on the conveyance. The conveyance is thereupon moved rearwardly whereby the stack withdraws a desired length of back strip material from a supply of such strip and the separated back strip is pressed against the selected edge face of the foremost stack. The separated portion of the web of coherent back strips is separated by a knife and the separated back strip is thereupon caused to advance through a system of rollers in order to fold the projecting marginal portions of the back strip over the adjacent major surfaces of the respective stack. Reference may be had to German Offenlegungsschrift No. 27 08 066.

A drawback of the just described conventional back stripping apparatus is its cost and complexity. Thus, the apparatus must employ a conveyance which must be provided with drive means for moving it back and forth in and counter to the direction of transport of stacks past the back stripping station. The mass of the conveyance is rather pronounced so that it cannot be moved back and forth at a very high frequency. Moreover, the apparatus must be provided with a table plate which is designed to move up and down in order to be in a position to bias a freshly separated back strip against the selected edge face of the oncoming stack of paper sheets or the like. Still further, the foremost back strip is caused to contact and to adhere to the marginal portion at the underside of the respective stack which automatically entails the need for repeated folding of the back strip about the selected edge face of the corresponding stack. In addition, the folding means of such apparatus is rather complex, expensive and prone to malfunction because it must be designed to prevent the formation of pleats or other irregularities which could detract from the appearance and/or other characteristics of the final products.

OBJECTS AND SUMMARY OF THE INVENTION

An object of the invention is to provide a novel and improved back stripping apparatus which is simpler, more compact, more reliable and less expensive than heretofore known back stripping apparatus.

Another object of the invention is to provide a back stripping apparatus which can apply back strips to discrete stacks of paper sheets or the like or to sets of two or more neighboring stacks.

A further object of the invention is to provide a back stripping apparatus which can apply back strips to successive stacks at a high frequency, with a heretofore ummatched degree of reproducibility and reliability, and without the danger of making wrinkles or other irregularities.

An additional object of the invention is to provide a back stripping apparatus which can be readily and rapidly converted for the application of back strips to short or long edge faces of stacked paper sheets or the like.

Still another object of the invention is to provide the apparatus with a novel and improved carrier for back strips and with novel and improved means for effecting movements of such carrier relative to the oncoming stacks of paper sheets or the like.

An additional object of the invention is to provide a novel and improved method of applying back strips to stacked paper sheets or the like.

A further object of the invention is to provide a back stripping apparatus which can be installed in existing production lines for stationary products as a superior substitute for heretofore known back stripping apparatus.

An additional object of the invention is to provide the back stripping apparatus with novel and improved means for withdrawing successive back strips of a web of coherent back strips from a source of supply of back strips.

A further object of the invention is to provide the apparatus with novel and improved means for folding portions of applied back strips over the major surfaces of the respective stacks.

The apparatus of the present invention serves to apply adhesive-coated back strips to the edge faces of stacks of paper sheets or the like. The apparatus comprises means (e.g., a single set or several sets of endless belt conveyors) for intermittently transporting a series of stacks along a predetermined path toward, to and beyond a back stripping station, a source of a web of coherent back strips, a carrier having means for withdrawing the web from the source and for holding the foremost back strip of the withdrawn portion of the web adjacent to the back stripping station, a mobile knife or other suitable means for separating successive foremost back strips from the web, and means for effecting a relative movement between the stack at the back stripping station and the separated foremost adhesive-coated back strip so as to press the separated back strip against the edge face of such stack. The holding means of the carrier is elongated and its length at least matches the length of the longest edge face which is to be provided with a back strip. Such holding means extends in parallelism with the edge face of the stack which occupies the back stripping station and the holding means can form part of or it can constitute the aforementioned withdrawing means, preferably an air-permeable conveyor and a suction chamber adjacent to the air-permeable conveyor. The air-permeable conveyor is preferably an endless flexible belt conveyor having an elongated reach which is adjacent to the back stripping station. One side of such elongated reach faces the stack at the back stripping station and the other side of such reach is adjacent to the suction chamber. The apparatus then further comprises prime mover means for intermittently driving the air-permeable conveyor through increments whose length at least equals the length of the edge face of the stack at the back stripping station. The air-permeable conveyor can be formed with one or more rows of openings by way of which the suction chamber attracts back strips to the one side of the aforementioned reach. The separating means is preferably mounted on the carrier. The suction chamber preferably comprises a first compartment and a second compartment which latter is disposed upstream of the first compartment, as considered in the direction of intermittent advancement of the air-permeable conveyor under the action of the prime mover means. The separating means is preferably adjacent to the one side of the aforementioned reach between the two compartments of the suction chamber, and the apparatus further comprises suction generating means and means for connecting the suction generating means with the compartments as well as means for selectively raising the pressure in the downstream compartment of the suction chamber so as to allow for convenient transfer of the separated foremost back strip of the web from the air-permeable conveyor onto the edge face of the stack at the back stripping station. The suction generating means can comprise discrete first and second suction generating devices, one for each of the two compartments, and the pressure raising means can comprise one or more pipes which can connect the downstream compartment with the surrounding atmosphere when the freshly separated adhesive-coated foremost back strip is to be pressed against the edge face of the stack at the back stripping station.

A paster can be provided to apply adhesive to one side of the back strip which adheres to the air-permeable conveyor, and such paster is or can be mounted on the carrier. The carrier and the separating means are preferably mounted in the frame of the apparatus or in an analogous supporting means in such a way that they are shiftable in the longitudinal direction of the carrier, namely lengthwise of the edge face of the stack at the back stripping station, in order to enable the carrier to apply shorter or longer back strips to shorter or longer edge faces upon appropriate adjustment of the prime mover means which serves to intermittently advance the air-permeable conveyor, i.e., to determine the length of successive back strips which are severed from the web. The separating means is located at the trailing end of the foremost back strip of the web.

In accordance with one embodiment of the invention, the elongated carrier extends transversely of the path of movement of the stacks under the action of the transporting means. The latter then transports the stacks in such a way that the edge faces which are to be bonded to back strips are the leading edge faces of the respective stacks. The movement effecting means then comprises means for cyclically moving the carrier into the path of successive stacks at the back stripping station so that the leading edge face of the oncoming stack is moved against the foremost back strip of the web which is held by the withdrawing means. The moving means preferably comprises means for lifting the carrier into and for lowering the carrier below the path.

The width of the back strips exceeds the width of the edge faces of stacks, and the carrier is arranged to maintain the separated foremost back strip of the web in such position that the marginal portions of the separated back strip extend above and below the leading edge face of the stack at the back stripping station. The path for the stacks is preferably horizontal. The apparatus further comprises means for folding the projecting marginal portions of successive separated back strips over the stacks adjacent to the respective edge faces. The folding means can comprise one or more elongated brushes, one or more elongated rollers or analogous rotary members. Such folding means is preferably disposed immediately downstream of the back stripping station.

In accordance with a second embodiment of the invention, the carrier is adjacent to one side of the path for the stacks and those edge faces of successive stacks which are about to be bonded to back strips are adjacent to the one side of the path. In such apparatus, the means for effecting a relative movement between the stack at the back stripping station and the carrier comprises means for cyclically moving the carrier toward and away from the edge face of the stack at the back stripping station. Such apparatus preferably further comprises means for opposing sidewise movement of the stack at the back stripping station under the action of the carrier. The folding means of such apparatus is preferably adjacent to and is disposed immediately downstream of the back stripping station. The carrier can perform translatory movements toward and away from the one side of the path. Alternatively, the carrier can be arranged to perform pivotal movements toward and away from the back stripping station.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
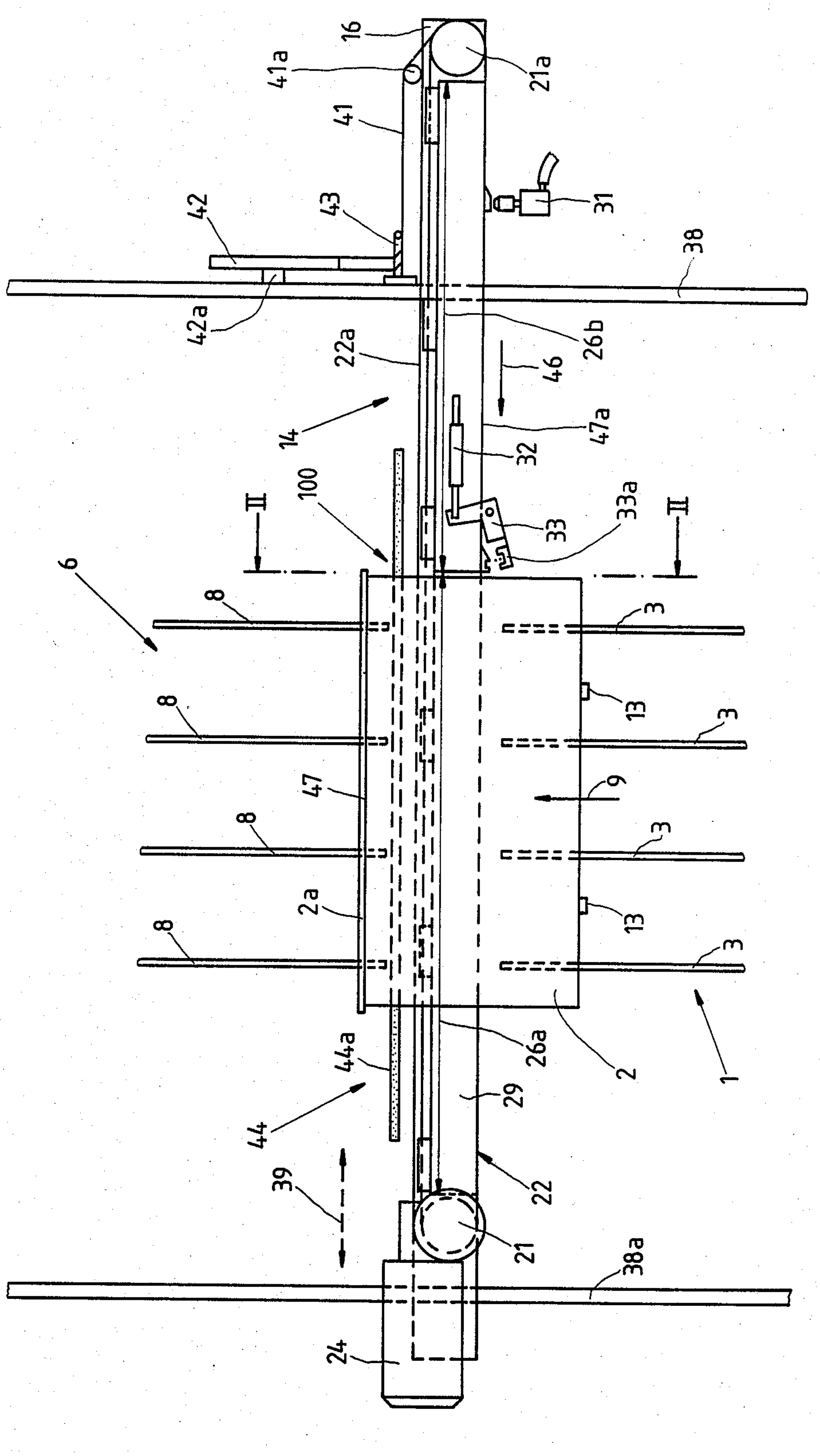
FIG. 1 is a schematic plan view of a back stripping apparatus which embodies one form of the invention and wherein the carrier of back strips is movable from below into and from the path of movement of successive stacks.
Figure 2:
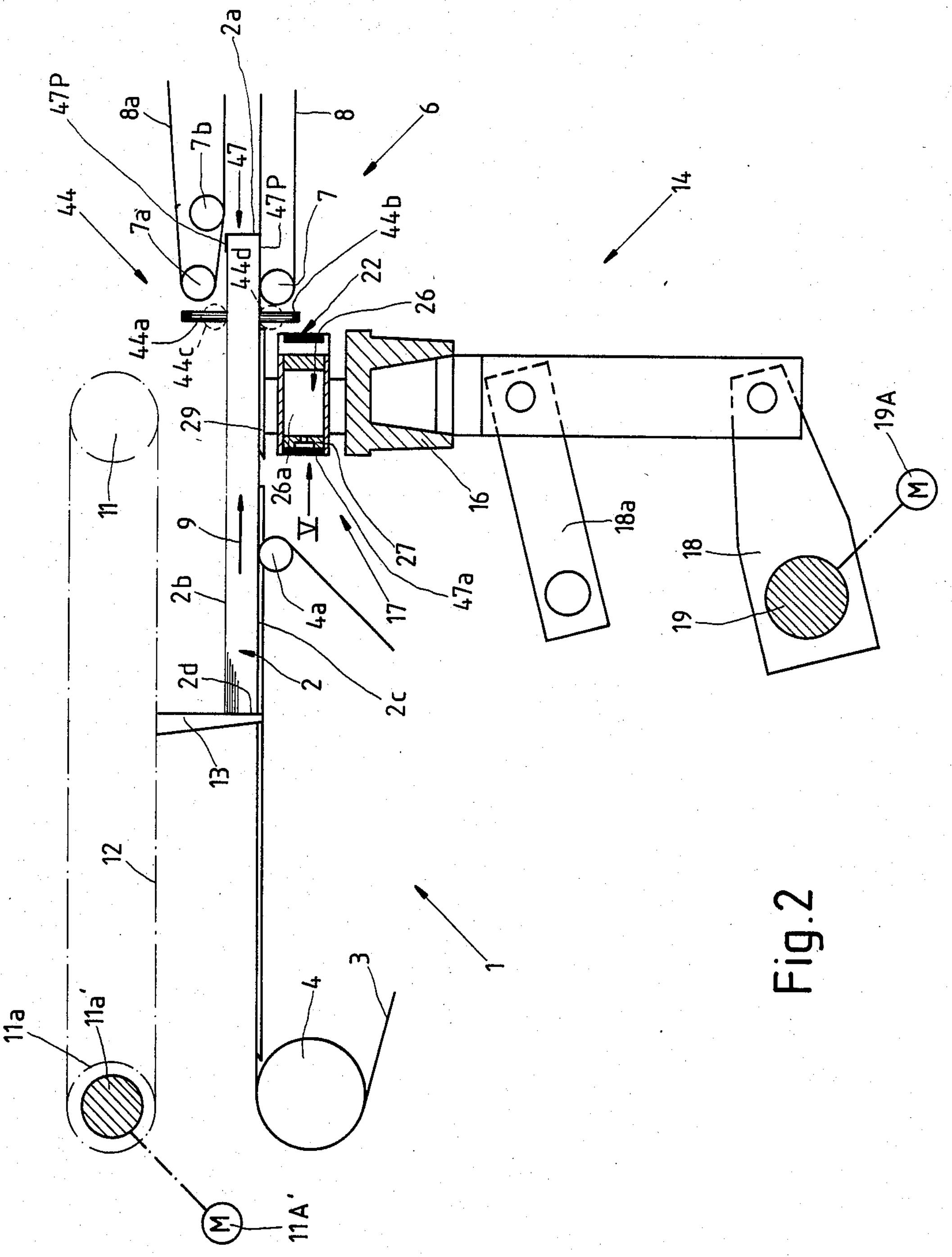
FIG. 2 is an enlarged longitudinal vertical sectional view as seen in the direction of arrows from the line II—II of FIG. 1.

Referring first to FIGS. 1 and 2, there is shown a back stripping apparatus which comprises a transporting unit 1 for stepwise advancement of successive stacks 2 of superimposed paper sheets along a predetermined horizontal path which is denoted by the arrow 9. The transporting unit 1 is designed to transport successive stacks 2 toward, to and beyond a back stripping station 100 and includes a supplying conveyor having a series of endless belts 3 trained over pulleys 4 and 4*a* so that the upper reaches of the belts 3 are at least substantially horizontal. The transporting unit 1 further comprises a removing conveyor 6 including a series of parallel endless belts 8 which are trained over pulleys 7 and a series of endless belts 8*a* which are trained over pulleys 7*a* and tensioning rolls 7*b* (see particularly FIG. 2). The belts 3 serve to deliver successive stacks 2 to the back stripping station 100, and the belts 8 and 8*a* serve to remove successive pads 2A (each of which includes a stack 2 and a suitably folded adhesive-coated back strip 47) away from the station 100. The transporting unit 1 further comprises several endless belt conveyors 12 which are trained over pulleys 11 and 11*a* at a level above the upper reaches of the belts 3. The belt conveyors 12 are provided with outwardly extending entraining fingers or prongs 13 which can advance successive stacks 2 in stepwise fashion through increments of predetermined length. The shaft 11*a'* of the pulleys 11*a* is driven by a suitable prime mover 11A' so as to advance the conveyor belts 12 and their entraining fingers 13 in stepwise fashion.

The apparatus of FIGS. 1 to 6 further comprises an elongated carrier 14 of coherent and discrete back strips 47. Such carrier extends transversely of the path 9 at the back stripping station 100. The carrier 14 comprises an elongated body 16 which supports a relatively narrow strip-shaped member 17 extending transversely of the path 9. The body 16 of the carrier 14 is mounted on one or more pairs of substantially parallel links 18 and 18*a*. Each link 18 is fixed to a horizontal shaft 19 which is pivotable clockwise and counterclockwise by a suitable reversible motor 19A so as to move the body 16 between the raised position of FIG. 4 and the lowered position of FIG. 2.

Figure 3:
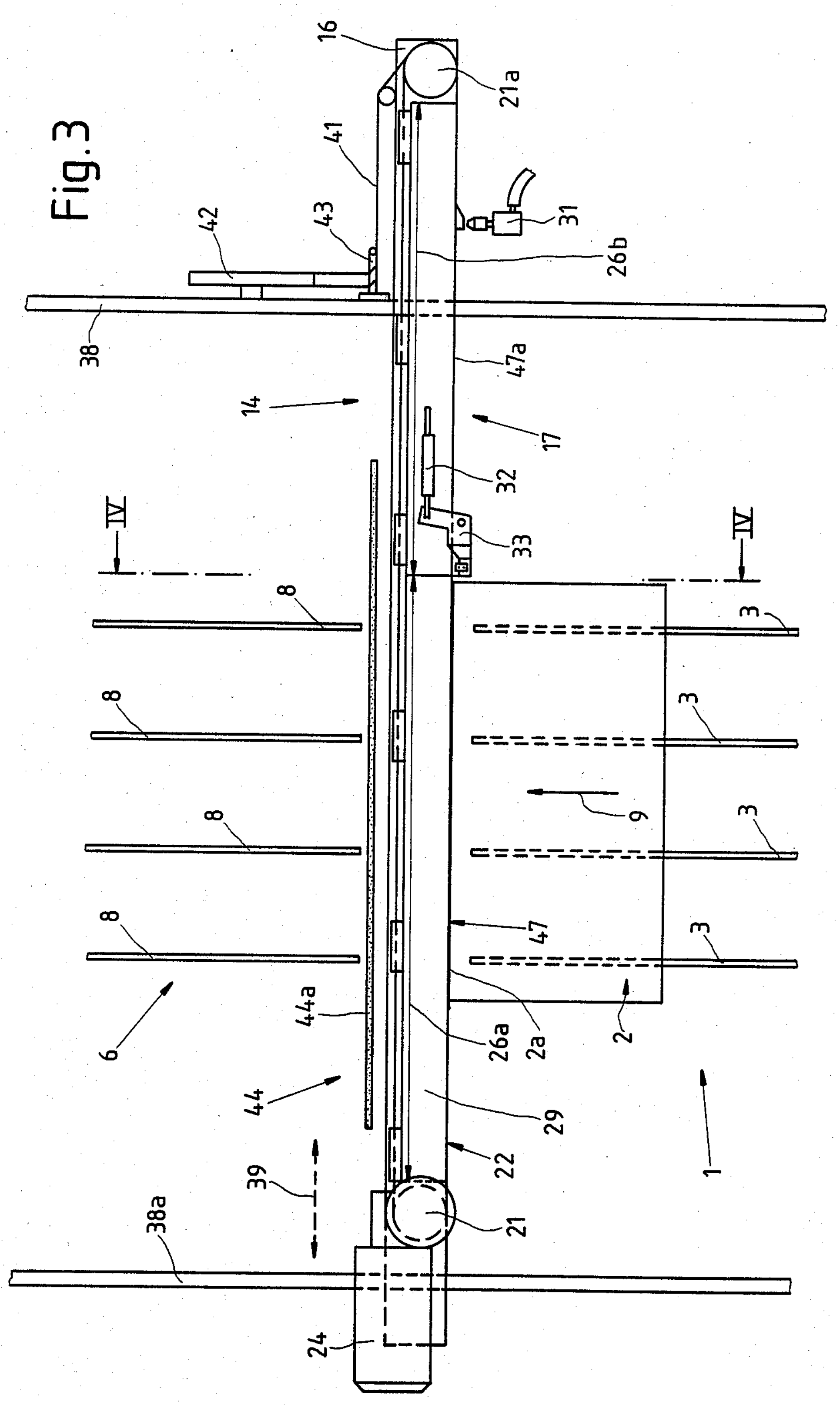
FIG. 3 is a plan view which is similar to that of FIG. 1 but shows another stage of the application of a back strip to the foremost untreated stack of paper sheets.
Figure 5:
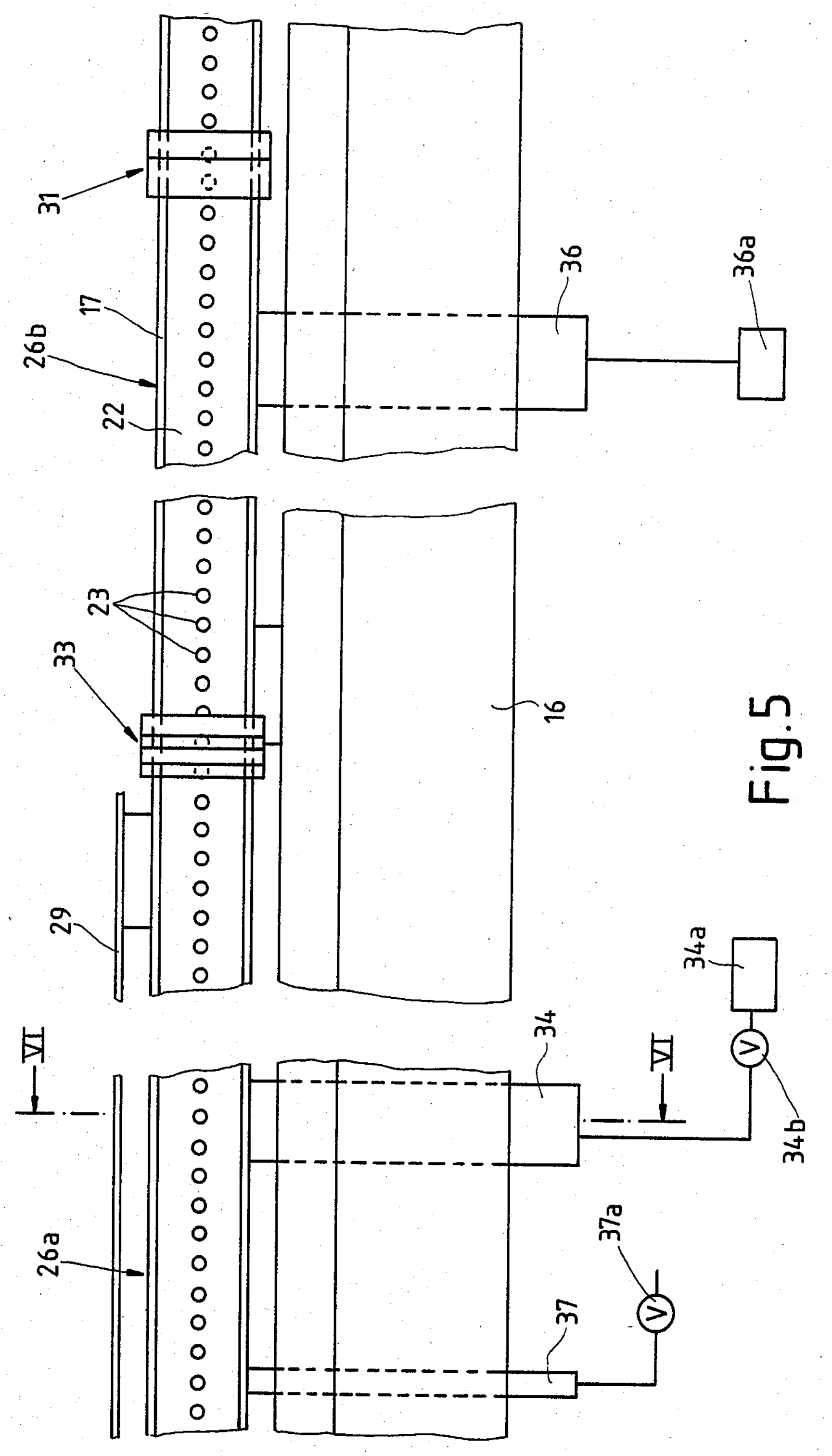
FIG. 5 is an enlarged view as seen in the direction of arrow V in FIG. 2.

The length of member 17 of the carrier 14 at least matches the width of the path 9 for the stacks 2. As can be seen in FIGS. 1 and 3, the length of such member exceeds the average width of the stacks 2, and more particularly the length of the leading edge faces 2*a* of successive stacks. The back strips 47 are to be applied to the leading edge faces 2*a* of successive stacks 2 at the back stripping station 100. The member 17 is parallel to the leading edge faces 2*a* of successive stacks 2. The end portions of the body 16 or of the member 17 of the carrier 14 support pulleys 21 and 21*a* of a combined web withdrawing and holding device 22 in the form of an air-permeable endless flexible belt conveyor 22 having an elongated reach 22*a* located in a vertical plane, extending transversely of the path 9, and releasably supporting not only the foremost back strip 47 of a series of coherent back strips but also at least a portion of the next-following back strip 47*a*. As can be seen in FIG. 5, the air-permeable conveyor 22 has a row of discrete holes or openings 23 which enable a suction chamber 26 to attract the foremost back strip 47 as well as the next-following back strip 47*a* so that such back strips adhere to the exposed side of the reach 22*a* preparatory to attachment of the foremost back strip 47 to the leading edge face 2*a* of the oncoming stack 2 at the back stripping station 100. The illustrated air-permeable conveyor 22 constitutes but one form of conveyor means which can be utilized to withdraw a series of coherent back strips 47, 47*a*, etc. from a source of supply 42 and to hold the foremost and next-to-the-foremost back strips at the exposed side of the reach 22*a*. For example, the illustrated conveyor 22 having a row of discrete holes 23 can be replaced with a conveyor which has a foraminous layer of fibrous or other suitable material so that small streamlets of air can pass therethrough and into the suction chamber 26 which is adjacent to the inner side of the raach 22*a*. The means for intermittently driving the conveyor 22 comprises an adjustable stepping motor 24 or an analogous prime mover which is mounted on the member 17 at a location remote from the source 42 of coherent back strips. As can be seen for example in FIG. 1, the prime mover 24 is located at one side of the path 9, and the source 42 is located at the other side of such path.

Figure 6:
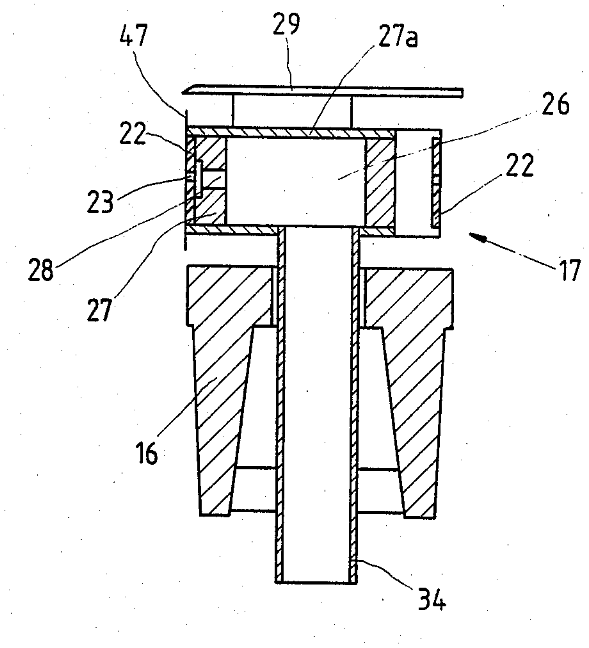
FIG. 6 is a sectional view as seen in the direction of arrows from the line VI—VI of FIG. 5.

FIG. 6 shows that the member 17 defines a suction chamber 26 having a length exceeding the width of the widest stacks 2 which are to be provided with back strips 47. The member 17 has a front wall 27 which has a row of holes 28 communicating at times with the adjacent holes or openings 23 in the reach 22*a* of the endless air-permeable conveyor 22 so as to enable the suction chamber 26 to attract the foremost back strip 47 as well as the next-following back strip 47*a* to the exposed side of the reach 22*a*. The row of openings 28 is located at the level of the openings 23 in the conveyor 22. The top wall 27*a* of the member 17 supports a horizontal bridge 29 which can be utilized as a means for permitting convenient transfer of successive stacks 2 from the upper reaches of the belts 3 onto the upper reaches of the belts 8.

The carrier 14 further supports a paster 31 which serves to coat the exposed surfaces of successive back strips 47, 47*a*, etc. with a film of suitable adhesive. Furthermore, the carrier 14 supports a separating or severing device 33 which is arranged to sever successive foremost back strips 47 from the next-following back strips 47*a*. The separating device 33 comprises a knife 33*a* which is pivotable by a pneumatic or hydraulic cylinder and piston unit 32 at predetermined intervals in order to sever a web 41 of coherent back strips in the region between two neighboring elongated compartments 26*a* and 26*b* of the suction chamber 26. The location of the cutting edge of the knife 33*a* coincides with the location of the junction between the foremost strip 47 and the next-following strip 47*a* of the web 41. Such web is stored in the source of supply 42. For example, the latter can constitute a reel which is mounted on a spindle 42*a* carried by the adjacent frame member 38 of the improved apparatus. The web 41 is trained around a suitable rod-like deflector 43 which is also supported by the adjacent frame member 38 so that successive increments of the web 41 advance over a guide roller 41*a* and thereupon over the pulley 21*a* for the conveyor 22.

The front or downstream compartment *26a* of the suction chamber 26 is designed to attract the foremost back strip 47 of the web 41, and the upstream compartment *26b* is designed to attract the next-following back strip *47a*, namely the back strip which is still attached to the major portion of the web 41. The partition between the compartments *26a* and *26b* of the suction chamber 26 is preferably located in the plane of the cutting edge of the knife *33a* forming part of the separating device 33. The compartment *26b* is connected with a suction generating device *36a* by way of a connecting nipple 36, and the compartment *26a* is connected with a discrete second suction generating device *34a* by a separate connecting nipple 34. This can be readily seen in FIG. 5. A pipe 37 with a valve *37a* therein is provided to selectively raise the pressure in the compartment *26a* by connecting this compartment with the atmosphere.

The means for shiftably supporting the carrier 14, together with the paster 31 and separating device 33, comprises the aforementioned frame member 38 as well as the second frame member *38a*. The directions in which the carrier 14 is shiftable relative to the frame members 38 and *38a* are indicated by a double-headed arrow 39. Such adjustments of the carrier 14 are necessary in order to enable the separating device 33 to sever from the web 41 back strips 47 of desired length, namely back strips having a length which at least matches the length of the leading edge faces *2a* on the stacks 2 which are supplied by the endless belt conveyor 3 of the transporting unit 1 and move stepwise along the path 9.

Figure 4:
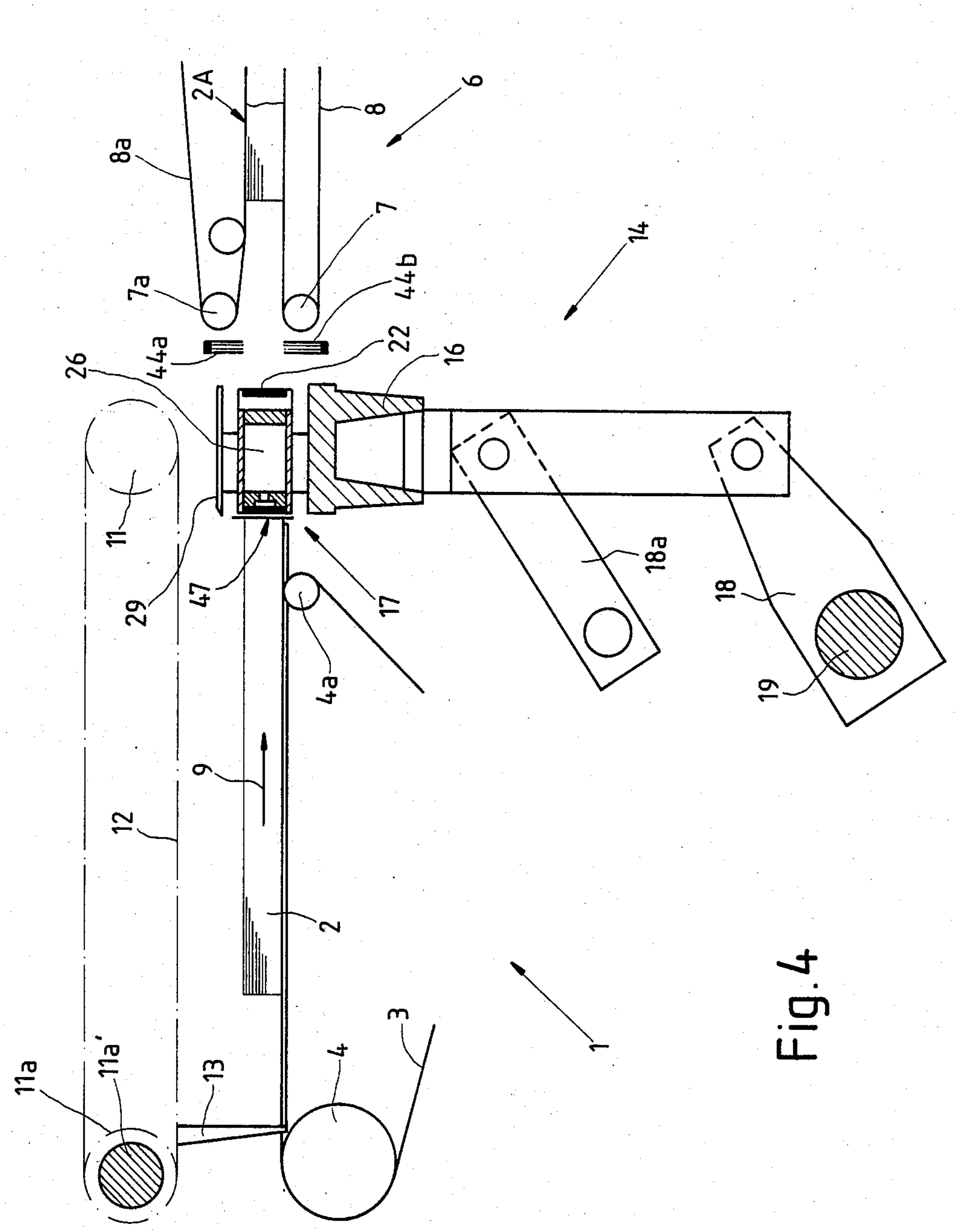
FIG. 4 is an enlarged longitudinal vertical sectional view as seen in the direction of arrows from the line IV—IV of FIG. 3.

As can be seen in FIGS. 2 and 4, the width (height) of the leading edge faces *2a* of the stacks 2 is less than the width of the back strips 47. Consequently, when a back strip 47 is placed into the path 9 of movement of the oncoming stack 2, its marginal portions 47P project upwardly and downwardly beyond the respective leading edge face *2a*. Such marginal portions 47P are folded over the adjacent major surfaces *2b* and *2c* of the respective stack 2 by a folding device 44 which is adjacent to and is located downstream of the back stripping station 100. In the embodiment which is shown in FIGS. 1 to 6, the folding device 44 comprises an upper elongated brush *44a* located adjacent to the major surface *2b* of the oncoming stack 2 and a lower elongated brush *44b* which is adjacent to the lower major surface *2c* of the oncoming stack 2. The bristles of the brushes *44a* and *44b* automatically fold the respective marginal portions 47P over the adjacent major surfaces *2b* and *2c* so that each back strip 47 constitutes a substantially U-shaped or channel-shaped body which fully overlies the respective leading edge face *2a* as well as the adjacent portions of the major surfaces *2b* and *2c* of the respective stack 2.

If desired, the brushes *44a* and *44b* of the folding device can be replaced by elongated folding rollers *44c* and *44d* which are indicated in FIG. 2 by phantom lines. Other types of one-piece or composite rotary folding members can be used with equal advantage.

The mode of operation of the back stripping apparatus which is shown in FIGS. 1 to 6 is as follows:

In the first step, the position of the carrier 14 is adjusted (in one of the directions which are indicated by the double-headed arrow 39) so as to ensure that the separating device 33 can sever from the web 41 successive back strips 47 having a length which matches or slightly exceeds the length of leading edge faces *2a* on the stacks 2 which are delivered by the transporting unit 1. The carrier 14 can be shifted by hand or by resorting to a suitable stepping motor which is not specifically shown in the drawing. The adjustment of the carrier 14 can be automatic in response to signals from a suitable sensor (not shown) serving to monitor the length of leading edge faces *2a* on the stacks 2 which are being transported by the upper reaches of the endless belt conveyors 3. The adjustment of the carrier 14 is such that the cutting edge of the knife *33a* forming part of the separating device 33 coincides with the plane of the adjacent end of the edge face *2a* on the oncoming stack 2.

The leader of the web 41 of coherent back strips 47, *47a*, etc. is withdrawn by hand from the source of supply 42 and is trained over the deflector 43 and over the outer side of the reach *22a* of the air-permeable conveyor 22 so that the leader of the web 41 is continuously attracted by the compartment *26b* of the suction chamber 26. Such leader is then located in the plane of the cutting edge of the knife *33a* of the separating device 33. This stage of operation of the improved back stripping apparatus is shown in FIGS. 1 and 2. The shaft 19 maintains the links 18 and *18a* in their lower end positions so that the entire carrier 14 is held in the position of FIG. 2 in which the bridge 29 is located between the upper reaches of the belts 3 and the upper reaches of the belts 8. A stack 2 whose leading edge face *2a* has been provided with a back strip 47 is pushed by the fingers or prongs 13 of the conveyor 12 so that it advances over the bridge 29 and into the gap between the conveyors 8 and *8a* which advance the pads 2A to the stacking station, not shown, where successive pads are gathered into a stack and are introduced into a suitable container. As the prongs 13 push the stack 2 over the bridge 29, such stack is caused to advance between the upper brush *44a* and the lower brush *44b* whereby such brushes fold the respective projecting marginal portions 47P of the freshly applied back strip 47 over the adjacent major surfaces *2b* and *2c* before the back strip 47 enters the space between the adjacent pulleys 7 and *7a*. The carrier 14 is disposed at a level below the path 9, and the stepping motor 24 is set in motion so as to advance the reach *22a* of the conveyor 22 in the direction which is indicated in FIG. 1 by the arrow 46. The length of each step which is performed by the motor 24 equals or slightly exceeds the length of a leading edge face *2a* so that the reach *22a* advances the foremost back strip 47 of the web 41 in front of the compartment *26a* of the suction chamber 26. The foremost back strip 47 is attracted to the raach *22a* in front of the compartment *26a* because the latter is then connected to the respective suction generating device *34a* by the connector 34. The next-following back strip *47a* is attracted to the reach *22a* in front of the compartment *26b* because the latter is permanently connected to the respective suction generating device *36a* by the corresponding connector 36. The compartment *26a* is further connected with the aforementioned pressure raising device 37 in the form of a pipe or conduit which can connect such compartment with the surrounding atmosphere in order to facilitate the transfer of the foremost back strip 47 onto the leading edge face *2a* of the oncoming stack 2 at the back stripping station 100.

When the stepping motor 24 is actuated, the web 41 is drawn off the source of supply 42 in the direction of the arrow 46, i.e., transversely of the path 9, from the frame member 38 toward the frame member *38a* as viewed in FIG. 1. The advancing web 41 moves along the paster 31 which coats the exposed side of the web with a film of suitable adhesive (for example, a wet adhesive or a holt melt) in order to ensure that the oncoming leading edge face *2a* will be automatically bonded to the foremost back strip 47 when the corresponding stack 2 reaches the back stripping station 100. The separating device 33 is actuated in automatic response to stoppage of the stepping motor 24.

The shaft 19 is rotated by the motor 19A in a counterclockwise direction, as viewed in FIG. 2, as soon as the trailing edge face *2d* of the stack 2 advances beyond the member 17 of the carrier 14. This causes the carrier 14 to move from the lowered position of FIG. 2 to the raised position of FIG. 4 in which the freshly separated foremost back strip 47 (the exposed surface of which is coated with a film of adhesive) extends transversely of and across the path 9 of movement of the next-following stack 2 of the series of stacks which are being delivered by the upper reaches of the belts 3. The back strip 47 on the reach *22a* of the air-permeable conveyor 22 is parallel to the plane of the leading edge face *2a* of the oncoming stack 2, and the marginal portions 47P of such back strip extend upwardly and downwardly beyond the oncoming leading edge face *2a*.

As a rule, or at least in many instances, the length of each foremost back strip 47 will be selected in such a way that it slightly exceeds the length of the oncoming leading edge face *2a*. This ensures that each back strip can fully overlie the respective edge face *2a*. The pipe 37 is caused to connect the compartment *26a* of the suction chamber 26 with the surrounding atmosphere not later than at the time when the foremost back strip 47 is contacted by the oncoming leading edge face *2a*. This ensures that the suction chamber 26 cannot attract such back strip 47 to the reach *22a* of the conveyor 22 with the result that the foremost back strip 47 (which is already separated from the next-following back strip *47a*) immediately adheres to and thereupon shares the forward movement of the stack 2 at the back stripping station 100. At such time, a valve *34b* in the connector 34 disconnects the respective suction generating device *34a* from the compartment *26a* to even further reduce the likelihood of unintentional adherence of the separated foremost back strip 47 to the reach *22a* of the conveyor 22 at the time when such back strip is to adhere to the adjacent leading edge face *2a*.

In the next step, the motor 19A is actuated to rotate the shaft 19 in a clockwise direction, as viewed in FIG. 4, so as to move the carrier 14 from the raised position of FIG. 4 back to the lowered position of FIG. 2. This moves the upper side of the bridge 29 on the top wall *27a* of the member 17 into the plane of the upper sides of the upper reaches of the belts 3 and 8 so that the foremost stack 2 is free to leave the station 100 in response to renewed actuation of the motor 11A' whereby the projecting marginal portions 47P of the freshly applied back strip 47 are folded by the bristles of the respective brushes *44a* and *44b* over the adjacent major surfaces *2b* and *2c* before the thus fully applied back strip 47 enters the space between the pulleys *7a* and 7 for the belts *8a* and 8. The lower reaches of the belts *8a* and the upper reaches of the belts 8 assist the bristles of the brushes *44a* and *44b* in that they prevent the freshly folded marginal portions 47P from moving away from the respective major surfaces *2b* and *2c* of the stack 2 which advances beyond the pulleys *7a* and 7 at the discharge end of the back stripping station 100. The apparatus preferably further comprises suitable trimming devices (not shown) which are utilized to remove those portions of the back strip 47 that extend beyond the corresponding ends of the leading edge face *2a* of the stack 2 between the conveyors 8 and *8a*.

The separating device 33 moves its knife *33a* to the retracted position as soon as the knife completes a separating operation (namely as soon as the knife *33a* separates the foremost back strip 47 from the next-following back strip *47a* of the web 41). This ensures that the motor 24 can advance the next-following back strip *47a* (which is then the foremost back strip) in front of the compartment *26a* of the suction chamber 26. At such time, the compartment *26a* is again connected with the corresponding suction generating device *34a* so that the foremost back strip adheres to the exposed side of the corresponding portion of the reach *22a* of the suction conveyor 22. The application of the foremost back strip to the next-following stack 2 of the series of stacks on the belt 3 is then carried out in the same way as described above.

In the apparatus which is shown in FIGS. 1 to 6, the carrier 14 extends transversely of the path 9 for the stack 2. It is equally within the purview of the invention to mount the carrier in such a way that it extends in parallelism with the direction of movement of successive stacks and is adjacent to one side of the path of such stacks. In such apparatus, the means (including the links 18, *18a*, shaft 19 and motor 19A) for effecting a movement of the carrier 14 relative to the stack 2 at or approaching the back stripping station 100 must be replaced with a modified movement effecting means, namely a moving means which can shift the carrier toward and away from the respective side of the path of movement of stacks. Moreover, the edge faces *2a* of the stacks 2 then face toward the respective side of the path, namely toward the carrier and its suction conveyor. It is further possible to replace the severing device 33 of FIGS. 1 to 6 with a modified severing device, for example a severing device wherein the knife 33 is replaced with a heated wire.

Figure 7:
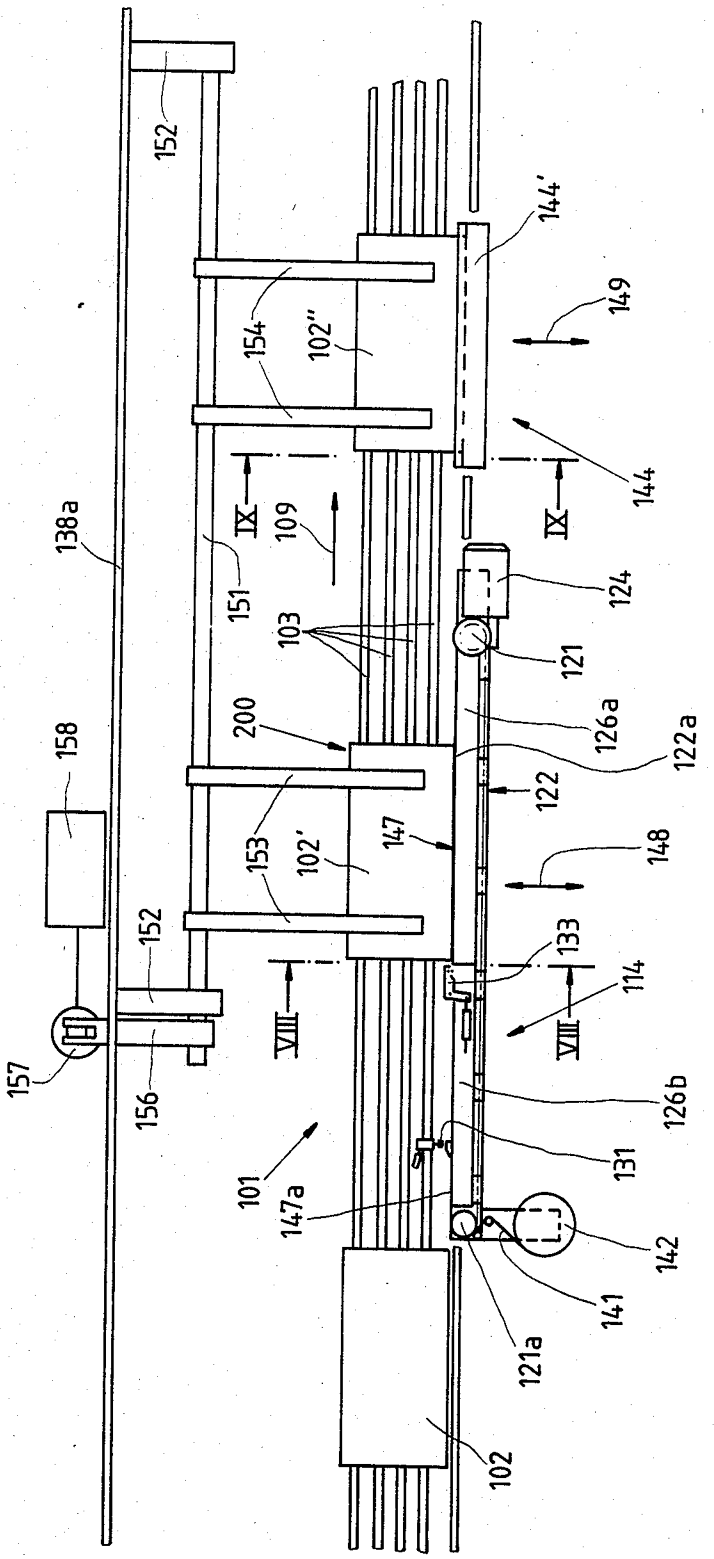
FIG. 7 is a plan view of a modified apparatus wherein the carrier of back strips is adjacent to one side of the path of movement of stacks.
Figure 8:
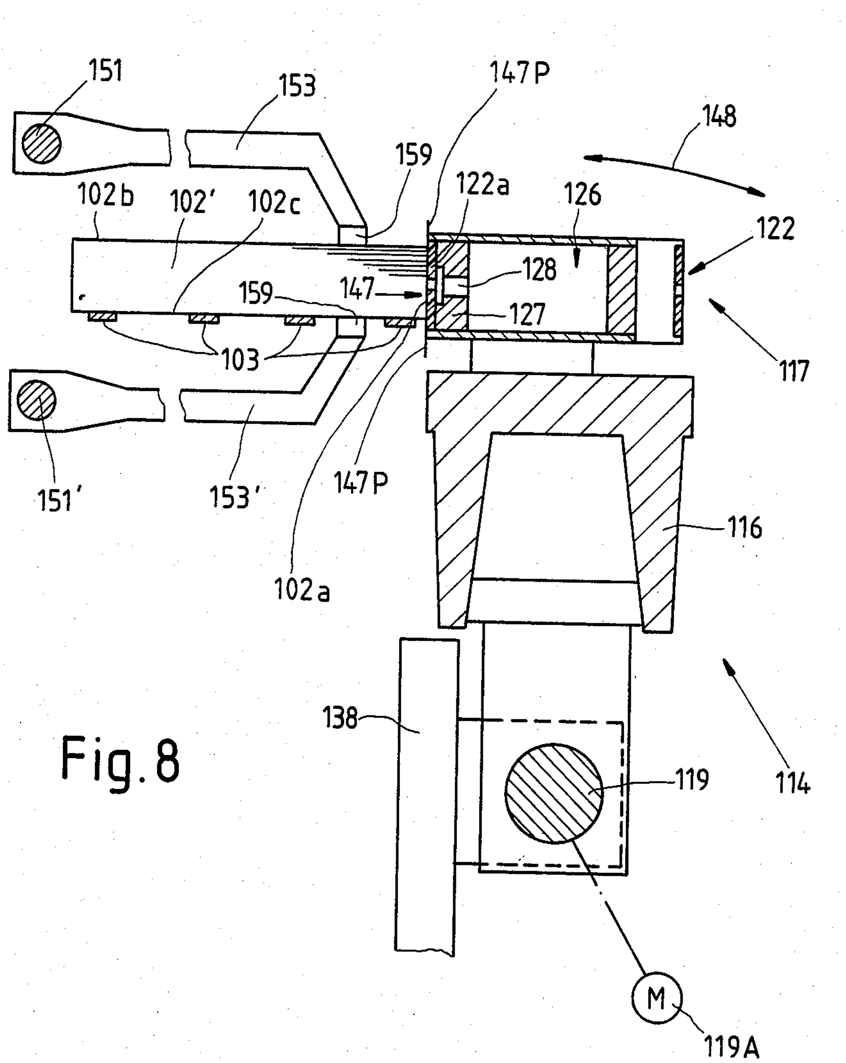
FIG. 8 is an enlarged transverse vertical sectional view as seen in the direction of arrows from the line VIII—VII of FIG. 7.
Figure 9:
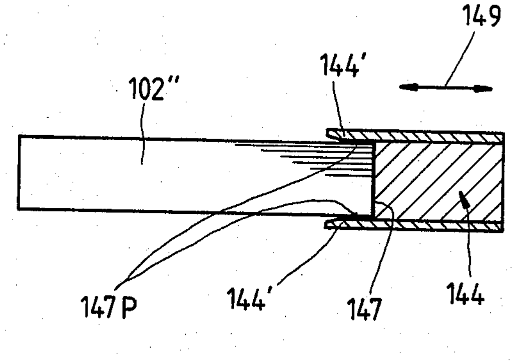
FIG. 9 is an enlarged fragmentary transverse vertical sectional view as seen in the direction of arrows from the line IX—IX of FIG. 7.

The apparatus which is shown in FIGS. 7 to 9 comprises a transporting unit 101 for a series of successive stacks 102. All such parts of this apparatus which are identical with or clearly analogous to the corresponding parts of the apparatus of FIGS. 1 to 6 are denoted by similar reference characters plus 100. The transporting unit 101 comprises a single set of endless belts 103 which transport the stacks 102 toward, to and beyond the back stripping station 200. The belts 103 are disposed in parallel vertical planes and are trained over suitable pulleys which are not specifically shown in the drawing. The carrier 114 is adjacent to one side of the elongated path which is denoted by the arrow 109. As shown in FIG. 8, the carrier comprises an elongated carrier body 116 and a strip-shaped member 117. The body 116 is non-rotatably secured to a drive shaft 119 which is mounted in the frame member 138 of the apparatus. The shaft 119 is rotatable back and forth by a suitable motor 119A to thereby pivot the entire carrier 114 in directions which are indicated by the double-headed arrow 148, namely toward and away from the respective side of the path 109. In the end position which is shown in FIG. 8, the carrier 114 is disposed in a substantially vertical plane and its member 117 extends substantially horizontally in parallelism with the upper reach of the nearest belt 103. The end portions of the carrier 114 support pulleys 121, *121a* for an endless air-permeable conveyor 122 which constitutes the means for withdrawing and holding successive back strips 147 of a web 141 of coherent back strips from a source of supply 142. The pulley 121 is driven intermittently by a stepping motor 124 so as to advance the web 141 by increments of preselected length, namely by increments each of which equals the length of the lateral edge face 102*a* of the stack 102 at the back stripping station 200. The outer side of the reach 122*a* of the conveyor 122 is adjacent to the path 109, and the inner side of such reach is adjacent to the compartments 126*a*, 126*b* of the suction chamber 126 which is defined by the member 117 of the carrier 114. The suction chamber 126 extends along the full length of the carrier 114. The wall 127 of the member 117 is the front wall of the suction chamber 126 and is provided with a row of holes or openings 128 in register with the openings or holes in the endless air-permeable conveyor 122. The reach 122*a* of the conveyor 122 transports successive increments of successive back strips 147, 147*a* along a paster 131 which is or can be mounted on the carrier 114 and which coats the outer side of the web 141 with a film of suitable adhesive. The paster 131 is mounted on the carrier 114 upstream of the back stripping station 200, as considered in the direction of transport of stacks 102 along the path 109. The purpose of the two compartments 126*a*, 126*b* of the suction chamber 126 in the member 117 of the carrier 114 is the same as described for the compartments 26*a*, 26*b* in connection with the embodiment of FIGS. 1 to 6. Furthermore, the manner in which the compartments 126*a*, 126*b* can be connected with discrete suction generating devices and in which the front compartment 126*a* can be vented in order to facilitate the transfer of the freshly separated foremost back strip 147 onto the adjacent edge face 102*a* of the stack 102 (in the position 102') at the station 200 is the same as described hereinbefore.

The folding means 144 of the apparatus shown in FIGS. 7 to 9 comprises an elongated brush 144' which defines a substantially U-shaped socket for the adjacent marginal portion of the stack 102 downstream of the station 200. The purpose of the socket is to ensure accurate folding of the marginal portions 147P of the freshly applied back strip 147 over the adjacent major surfaces 102*b* and 102*c* of the stack 102 (in the position 102"). In lieu of brushes 144', the folding means 144 can also comprise suitable elastic strips which are sufficiently rigid to ensure adequate folding of the marginal portions 147P over the surfaces 102*b* and 102*c* of the stack 102 which reaches the folding station downstream of the back stripping station 200.

The carrier 114 is located at one side of the path 109, and the apparatus further comprises two parallel horizontal shafts 151 and 151' (see particularly FIG. 8) which are adjacent to the other side of the path 109 opposite the carrier 114. The end portions of such shafts are mounted in brackets 152 which are secured to the frame member 138*a* at the respective side of the path 109. The shafts 151 and 151' carry two sets of grippers or jaws 153, 153' and 154. The jaws 153 and 153' are disposed at the back stripping station 200 and the jaws 154 are disposed at the station for the folding device 144, i.e., downstream of the back stripping station 200. The jaws 153, 153' and 154 are non-rotatably secured to the respective shafts 151, 151'. The shafts 151 and 151' are non-rotatably connected with levers 156 which are pivotable back and forth by a pneumatic motor 157. The motor 157 receives compressed air or another suitable gaseous fluid from a source 158. The system of valves which regulate the flow of compressed gaseous fluid to and from the motor 157 is not specifically shown in the drawing. The end portions of the jaws 153 and 153' are close to the carrier 114 when the latter is held in the position of FIG. 8, and such end portions are provided with cushions 159 which can respectively engage the uppermost and lowermost sheets of the stack 102 at the station 200. The jaws 154 are provided with similar cushions (not specifically shown) which can properly engage the topmost and bottom sheets of the stack 102 at the folding station.

The operation of the apparatus which is shown in FIGS. 7 to 9 is as follows:

While the transporting unit 101 advances a stack 102 from the solid-line position (shown in the left-hand portion of FIG. 7) to the back stripping station 200 where such stack assumes the position 102', the carrier 114 is held in the retracted position, namely in a position in which the member 117 is located to the right of the position shown in FIG. 8. At such time, the stepping motor 124 is set in motion in order to withdraw a back strip 147 from the source 142 so that the foremost back strip 147 of the web 141 is adjacent to the back stripping station 200. The outer side of the web 141 is coated with adhesive by the paster 131 during operation of the stepping motor 124, and the separating device 133 is thereupon actuated in order to separate the foremost back strip 147 from the remainder of the web 141. Such freshly separated back strip 147 is attracted to the reach 122*a* of the conveyor 122 by suction in the compartment 126*a* of the suction chamber 126.

While a fresh stack 102 approaches the station 200, the jaws 153, 153' are held apart so that the distance between the upper and lower cushions 159 exceeds the thickness of the oncoming stack 102. When the belts 103 are brought to a halt and the freshly delivered stack 102 assumes the position 102' of FIGS. 7 and 8, the shafts 151 and 151' are pivoted by the levers 156 so as to move the cushions 159 toward each other whereby the cushions engage and compress the stack close to the respective edge face 102*a*. In the next step, the motor 119A rotates the shaft 119 in a counterclockwise direction, as viewed in FIG. 8, so that the carrier 114 is returned to the position of FIG. 8 and the freshly separated foremost back strip 147 is pressed against the edge face 102*a* while the cushions 159 hold the stack 102 against movement in a direction to the left, as viewed in FIG. 8. This ensures proper application of the back strip 147 to the edge face 102*a*. In the next step, the compartment 126*a* of the suction chamber 126 is connected to the atmosphere so that the reach 122*a* of the conveyor 122 ceases to attract the back strip 147 whereby the latter is free to advance with the stack 102 toward the folding station as soon as the belts 103 are set in motion again. The carrier 114 is preferably pivoted away from the position of FIG. 8 before the belts 103 are started in order to advance the stack 102 into the range of the folding device 144.

Furthermore, the shafts 151, 151' are caused to move the cushions 159 of the jaws 153, 153' apart so as to allow for unimpeded transport of the stack 102 to the position 102" of FIG. 7.

While the belts 103 transfer the stack 102 to the position 102" of FIG. 7, the next stack 102 is transported to the back stripping station 200 where the application of a fresh back strip 147 is carried out in the aforedescribed manner. The cushions at the free ends of the jaws 154 on the shaft 151, 151' engage the adjacent sheet of the stack 102 close to the folding device 144 in order to ensure that the folding device can be moved against the freshly applied back strip 147 so that the marginal portions 147P of such back strip are folded over the adjacent surfaces **102*b* and 102*c* of the respective stack 102 in a manner as shown in FIG. 9. This completes the conversion of the stack 102 into a pad wherein the sheets are held together by the substantially U-shaped binder constituted by the deformed back strip 147. The manner in which the folding means 144 is movable toward and away from the respective side of the path 109 is preferably the same as described for the carrier 114. In fact, the shaft 119 can be used to pivot the folding means 144 to and from the operative position of FIGS. 7 and 9. The directions in which the folding means 144 is pivotable or otherwise movable toward and away from the path 109 are indicated by the double-headed arrow 149. The movements of the carrier 114, shafts 151, 151', folding means 144, stepping motor 124, means for actuating the separating device 133 and means for intermittently moving the belts 103** can be synchronized in a well known manner which forms no part of the present invention.

It will be noted that the main difference between the apparatus of FIGS. 1 to 6 and FIGS. 7 to 9 is that, in the apparatus of FIGS. 7 to 9, the edge faces **102*a* which are to be contacted by back strips 147 do not extend transversely of the path 109 and, therefore, the carrier 114 is adjacent to one side of such path. In other words, the orientation of edge faces 102*a* is changed by 90 degrees with reference to the orientation of edge faces 2*a* in the apparatus of FIGS. 1 to 6. Moreover, whereas the apparatus of FIGS. 1 to 6 comprises a means 19 for effecting upward and downward movements of the carrier 14 to such position with reference to the edge face 2*a* of the stack 2 at the back stripping station 100 in which the freshly separated back strip 47 extends transversely of the path 9, the apparatus of FIGS. 7 to 9 comprises means 119 for effecting a pivotal movement of the carrier 114 to and from the position of FIG. 8 in which the freshly separated back strip 147 is urged against the edge face 102*a* of the stack 102 at the station 200 while the cushions 159 of the jaws 153, 153' prevent the stack 102 from moving sideways, namely transversely of the direction of movement of stacks along the path 109. In each of the two apparatus, the carrier 14 or 114 is retracted in time to allow for unimpeded forward movement of the stack from the respective back stripping station in a direction toward, past and beyond the corresponding folding station. If desired, the carrier 114 can be mounted to perform straight-line translatory (rather than pivotal) movements to and from the position of FIG. 8**.

The improved apparatus exhibits a number of important advantages. Thus, the provision of stepping motors 24 or 124 renders it possible to accurately select the length of successively formed back strips 47, 147 so that such length at least matches, if it does not slightly exceed, the length of the corresponding edge faces **2*a*, 102*a*. Moreover, a suction conveyor (22 or 122) is especially suited for reliable withdrawal and retention or holding of successive back strips 47, 147 in positions of readiness for application to the respective edge faces. The versatility of the apparatus is enhanced due to the fact that the carrier 14 or 114 is shiftable lengthwise with respect to its frame so as to enable the apparatus to properly apply relatively long or relatively short back strips, depending on the dimensions of the stacks which are being transported by the unit 1 or 101. The subdivision of suction chamber 26 or 126 in two compartments renders it possible to properly hold the next-to-the-foremost back strip 47*a* or 147*a* while the foremost back strip 47 or 147 is released so as to facilitate its application to the adjacent edge face. The mounting of an adhesive-applying device and of a separating device on the carrier 14 or 114 ensures proper positioning of such devices with reference to the web 41 or 141 irrespective of the selected position of the carrier 14 or 114 relative to the path 9 or 109. It will be noted that the mode of operation of the transporting unit 1 or 101 need not be modified when such unit is called upon to transport differently dimensioned stacks. All that is necessary when the operators wish to convert the apparatus for the processing of differently dimensioned stacks is to change the setting of the stepping motor 24 or 124 and to properly adjust the position of the carrier 14 or 114 relative to the transporting unit 1 or 101**. Such conversion takes up little time and can be carried out by semi-skilled or unskilled persons.

The apparatus of FIGS. 1 to 6 exhibits the advantage that it is not necessary to provide discrete means for pressing successive back strips 47 against the edge faces **2*a* of the respective stacks 2. This is due to the fact that the carrier 14 extends transversely of the path 9 and is simply lifted into the path of movement of the oncoming stack 2 so that the prongs 13 can push the oncoming stack 2 against the member 17 with sufficient force to ensure adequate transfer and application of the freshly separated back strip 47 to the edge face 2*a***. This simplifies the construction of the apparatus and contributes to its compactness.

The advantage of the folding device 44 is its simplicity. Thus, such folding device merely comprises one or more brushes or one or more rotary members which can fold or roll the marginal portions 47P of a freshly applied back strip 47 over the adjacent major surfaces **2*b*, 2*c* of the stack 2 advancing beyond the back stripping station 100. The operation of the apparatus is sufficiently accurate to ensure that the freshly applied back strip 47 extends to a required extent beyond the longitudinal marginal portions of the respective edge face 2*a*. If desired, the upper or the lower marginal portion 47P can be wider than the other marginal portion. This depends on the nature of stationery products which are being produced and on the desired extent to which the front side of the resulting pad, exercise book or pamphlet is to be overlapped by the back strip 47**.

Another important advantage of the improved apparatus is its surprising simplicity and reliability. The apparatus is sufficiently versatile to be capable of installation in spaces that are available in a paper processing plant. This is due to the fact that the carrier can be mounted for movement up and down into the and from the path of movement of the stacks (FIGS. 1 to 6) or laterally toward and away from the adjacent side of such path. Moreover, the folding operation can be completed in a single step and each of the two marginal portions of a freshly applied back strip can be folded over at one and the same station. The folding means is very simple, reliable and can stand long periods of use. Still further, the back strip 47 or 147 which is in the process of being attached to the edge face of the adjacent stack is not subjected to any tensional stresses so that it does not undergo any deformation during application to the adjacent stack and does not form any pleats, wrinkles or other formations which could detract from the appearance of the ultimate product and could adversely influence the reliability of the connection which is established by the back strips. Moreover, the absence of tensional stresses upon the back strips during their application to stacks ensures that such back strips are not shifted from optimum positions which are selected therefor by the mounting of the carrier 14 or 114.

Still another advantage of the improved apparatus is that it can be rapidly and simply converted for the application of longer or shorter or wider or narrower back strips to differently dimensioned and/or oriented stacks.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for applying adhesive-coated back strips to the edge faces of stacks of paper sheets or the like, comprising means for intermittently transporting a series of stacks along a predetermined path toward, to and beyond a back stripping station; a source of a web of coherent back strips; a carrier having means for withdrawing the web from said source and for holding the foremost back strip of the web adjacent to said station; means for separating successive foremost back strips from the web prior to application of such strips to the respective stacks; and means for effecting a relative movement between the stack at said station and the separated foremost adhesive-coated back strip so as to press the separated back strip against the edge face of such stack.

2. The apparatus of claim 1 for applying back strips to stacks having edge faces of predetermined length, wherein said holding means is elongated and its length at least matches said predetermined length.

3. The apparatus of claim 1, wherein said holding means extends in parallelism with the edge face of the stack at said back stripping station and said withdrawing means comprises an air-permeable conveyor and a suction chamber adjacent to said conveyor.

4. The apparatus of claim 3, wherein said conveyor is an endless flexible conveyor having an elongated reach adjacent to said back stripping station, said reach of said conveyor having a first side facing the edge face of the stack at said back stripping station and a second side, said suction chamber being adjacent to said second side and further comprising prime mover means for intermittently driving said conveyor.

5. The apparatus of claim 4, wherein said conveyor has a row of openings by way of which said suction chamber attracts back strips to the first side of said reach.

6. The apparatus of claim 4, wherein said separating means comprises a severing device mounted on said carrier and adjacent to the first side of said reach.

7. The apparatus of claim 4, wherein said prime mover means is arranged to drive said reach in a predetermined direction and said suction chamber comprises a first and a second compartment, said second compartment being disposed downstream of said first compartment, as considered in said direction, and said separating means being adjacent to said first side intermediate said compartments, and further comprising suction generating means, means for connecting said suction generating means with said compartments, and means for selectively raising the pressure in said second compartment.

8. The apparatus of claim 7, wherein said suction generating means comprises discrete first and second suction generating devices for the respective compartments and said pressure raising means comprises means for connecting said second compartment with the surrounding atmosphere.

9. The apparatus of claim 4, further comprising means for applying adhesive to one side of the back strip which adheres to said reach of said conveyor.

10. The apparatus of claim 9, wherein said adhesive applying means is mounted on said carrier.

11. The apparatus of claim 10, wherein said separating means is mounted on said carrier.

12. The apparatus of claim 1, wherein said carrier is elongated and further comprising means for supporting said carrier and said separating means for movement longitudinally of the edge face of the stack at said station so as to conform the length of separated foremost back strips to the length of edge faces of stacks at said station.

13. The apparatus of claim 12, wherein said separating means is mounted on said carrier and is located at the trailing end of the foremost back strip of the web.

14. The apparatus of claim 1, wherein said carrier is elongated and extends transversely of said path.

15. The apparatus of claim 14, wherein the edge faces which are to be bonded to back strips are the leading edge faces of the stacks in said path, as considered in the direction of movement of stacks toward and beyond said station, said movement effecting means including means for cyclically moving said carrier into the path of successive stacks at said station so that the leading edge face of the oncoming stack is moved against the foremost back strip of the web which is held by said withdrawing means.

16. The apparatus of claim 15, wherein said moving means includes means for lifting said carrier into and for lowering said carrier below said path.

17. The apparatus of claim 15 for applying back strips to stacks having leading edge faces of predetermined width, wherein the width of back strips exceeds said predetermined width and said path is substantially horizontal, said carrier being arranged to maintain the separated foremost back strip of the web in said path in such position that the marginal portions of the separated foremost back strip in said path extend above and below the leading edge face of the stack at said station.

18. The apparatus of claim 1 for applying back strips to stacks having edge faces of predetermined width, wherein the width of the back strips exceeds said predetermined width so that at least one marginal portion of each separated foremost back strip projects beyond the edge face of the respective stack, and further comprising means for folding the projecting marginal portions of the back strips over the stacks adjacent to the respective edge faces.

19. The apparatus of claim 18, wherein said folding means comprises at least one elongated brush.

20. The apparatus of claim 18, wherein said folding means comprises at least one elongated rotary member.

21. The apparatus of claim 18, wherein said folding means is closely adjacent to and is located downstream of said station, as considered in the direction of movement of stacks under the action of said transporting means.

22. The apparatus of claim 1, wherein said carrier is adjacent to one side of said path and the edge faces of the stacks in said path are adjacent to said one side of such path.

23. The apparatus of claim 22, wherein said means for effecting said relative movement includes means for cyclically moving the carrier toward and away from the edge face of the stack at said station.

24. The apparatus of claim 23, further comprising means for opposing sidewise movement of the stack at said station under the action of said carrier.

25. The apparatus of claim 24 for applying back strips to stacks having edge faces of predetermined width, wherein the width of the back strips exceeds said predetermined width so that at least one marginal portion of each foremost back strip projects beyond the edge face of the respective stack, and further comprising means for folding the projecting marginal portions of back strips over the respective stacks adjacent to the corresponding edge faces downstream of said station.

26. The apparatus of claim 23, wherein said carrier is arranged to perform translatory movements under the action of said moving means.

27. The apparatus of claim 23, wherein said moving means is arranged to pivot said carrier toward and away from the edge face of the stack at said station.

* * * * *